(12) United States Patent
Redden et al.

(10) Patent No.: US 11,030,804 B2
(45) Date of Patent: *Jun. 8, 2021

(54) SYSTEM AND METHOD OF VIRTUAL PLANT FIELD MODELLING

(71) Applicant: Blue River Technology Inc., Sunnyvale, CA (US)

(72) Inventors: Lee Kamp Redden, Palo Alto, CA (US); Nicholas Apostoloff, San Jose, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,026

(22) Filed: Aug. 3, 2020

(65) Prior Publication Data

US 2020/0364932 A1 Nov. 19, 2020

Related U.S. Application Data

(63) Continuation of application No. 15/996,810, filed on Jun. 4, 2018, now Pat. No. 10,769,845, which is a
(Continued)

(51) Int. Cl.
*G06T 15/00* (2011.01)
*G06T 17/05* (2011.01)
(Continued)

(52) U.S. Cl.
CPC .............. *G06T 17/05* (2013.01); *G06T 7/11* (2017.01); *G06T 7/33* (2017.01); *G06T 7/337* (2017.01);
(Continued)

(58) Field of Classification Search
CPC .......... G06T 7/11; G06T 17/20; G06T 7/337; G06T 17/05; G06T 7/194; G06T 7/74;
(Continued)

(56) References Cited

U.S. PATENT DOCUMENTS 8,610,712 B2 * 12/2013 Cohen ...................... G06T 7/12
345/419
9,367,944 B2 * 6/2016 Kim ........................ G06T 17/00
(Continued)

OTHER PUBLICATIONS

Li R, Bu G, Wang P. An automatic tree skeleton extracting method based on point cloud of terrestrial laser scanner. International Journal of Optics. Jan. 1, 2017;2017.*
(Continued)

*Primary Examiner* — Phu K Nguyen
(74) *Attorney, Agent, or Firm* — Fenwick & West LLP

(57) ABSTRACT

A technique for generating virtual models of plants in a field is described. Generally, this includes recording images of plants in-situ; generating point clouds from the images; generating skeleton segments from the point cloud; classifying a subset of skeleton segments as unique plant features using the images; and growing plant skeletons from skeleton segments classified as unique plant feature. The technique may be used to generate a virtual model of a single, real plant, a portion of a real plant field, and/or the entirety of the real plant field. The virtual model can be analyzed to determine or estimate a variety of individual plant or plant population parameters, which in turn can be used to identify potential treatments or thinning practices, or predict future values for yield, plant uniformity, or any other parameter can be determined from the projected results based on the virtual model.

21 Claims, 7 Drawing Sheets

Related U.S. Application Data continuation of application No. 15/157,997, filed on May 18, 2016, now Pat. No. 10,008,035.

(60) Provisional application No. 62/163,147, filed on May 18, 2015.

(51) Int. Cl.
| | |
|---|---|
| *G06T 15/08* | (2011.01) |
| *G06T 17/20* | (2006.01) |
| *G06T 7/33* | (2017.01) |
| *G06T 7/73* | (2017.01) |
| *G06T 7/11* | (2017.01) |
| *G06T 7/194* | (2017.01) |

(52) U.S. Cl.
CPC .............. *G06T 7/344* (2017.01); *G06T 7/74* (2017.01); *G06T 15/08* (2013.01); *G06T 17/20* (2013.01); *G06T 7/194* (2017.01); *G06T 2210/56* (2013.01); *G06T 2219/2008* (2013.01)

(58) Field of Classification Search
CPC ....... G06T 7/344; G06T 7/33; G06T 2210/56; G06T 15/08; G06T 2219/2008
USPC ........................................................ 345/418
See application file for complete search history.

(56) References Cited

U.S. PATENT DOCUMENTS

| | | | |
|---|---|---|---|
| 10,008,035 B1* | 6/2018 | Redden | G06T 7/74 |
| 10,491,879 B2* | 11/2019 | Redden | G06T 7/593 |
| 10,769,845 B2* | 9/2020 | Redden | G06T 17/20 |
| 10,812,776 B2* | 10/2020 | Redden | H04N 13/128 |
| 2004/0264763 A1* | 12/2004 | Mas | G06K 9/00664 382/154 |
| 2015/0321694 A1* | 11/2015 | Nelson, Jr. | G06K 9/00791 382/104 |

OTHER PUBLICATIONS

Jin D, Iyer KS, Hoffman EA, Saha PK. A new approach of arc skeletonization for tree-like objects using minimum cost path. In2014 22nd International Conference on Pattern Recognition Aug. 24, 2014 (pp. 942-947). IEEE.*

Saudreau M, Marquier A, Adam B, Sinoquet H. Modelling fruit-temperature dynamics within apple tree crowns using virtual plants. Annals of Botany. Oct. 1, 2011;108(6):1111-20.*

Delagrange S, Jauvin C, Rochon P. PypeTree: a tool for reconstructing tree perennial tissues from point clouds. Sensors. Mar. 2014;14(3):4271-89.*

Eysn L, Pfeifer N, Ressl C, Hollaus M, Grafl A, Morsdorf F. A practical approach for extracting tree models in forest environments based on equirectangular projections of terrestrial laser scans. Remote Sensing. Nov. 2013;5(11):5424-48.*

Hackenberg J, Morhart C, Sheppard J, Spiecker H, Disney M. Highly accurate tree models derived from terrestrial laser scan data: A method description. Forests. May 2014;5(5): 1069-105.*

Buckley DJ, Ulbricht C, Berry J. The virtual forest: Advanced 3-D visualization techniques for forest management and research. InESRI 1998 User Conference, Jul. Jul. 27, 1998 (pp. 27-31).*

\* cited by examiner

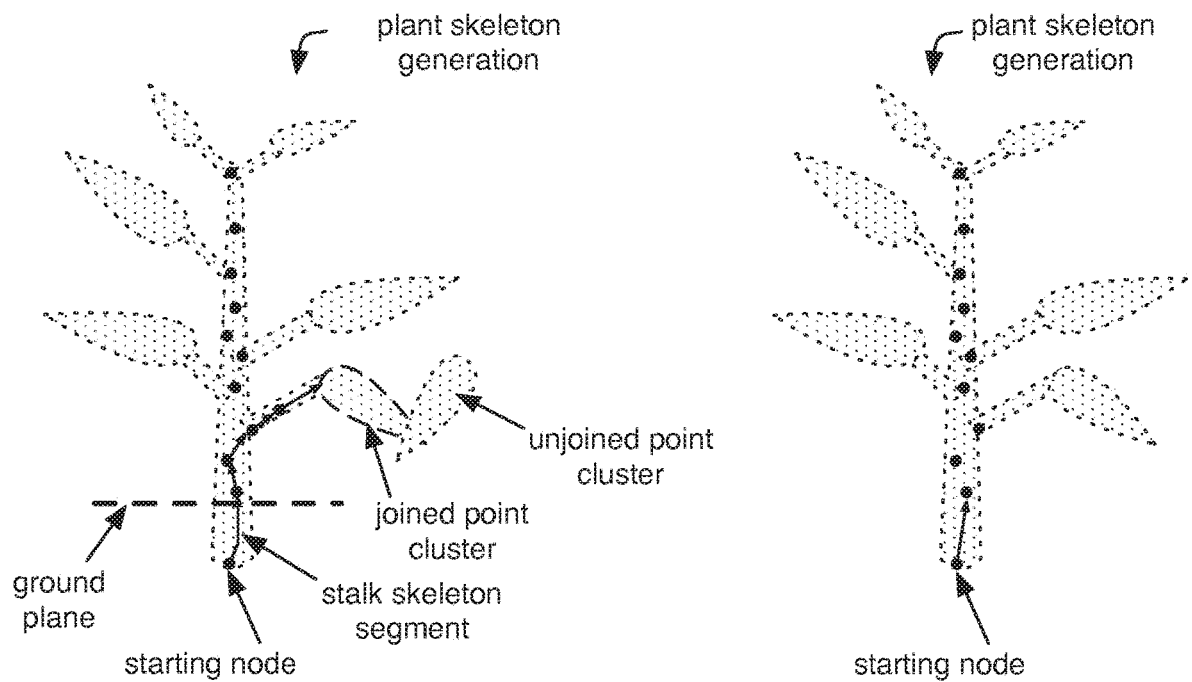
FIGURE 2A
FIGURE 2B
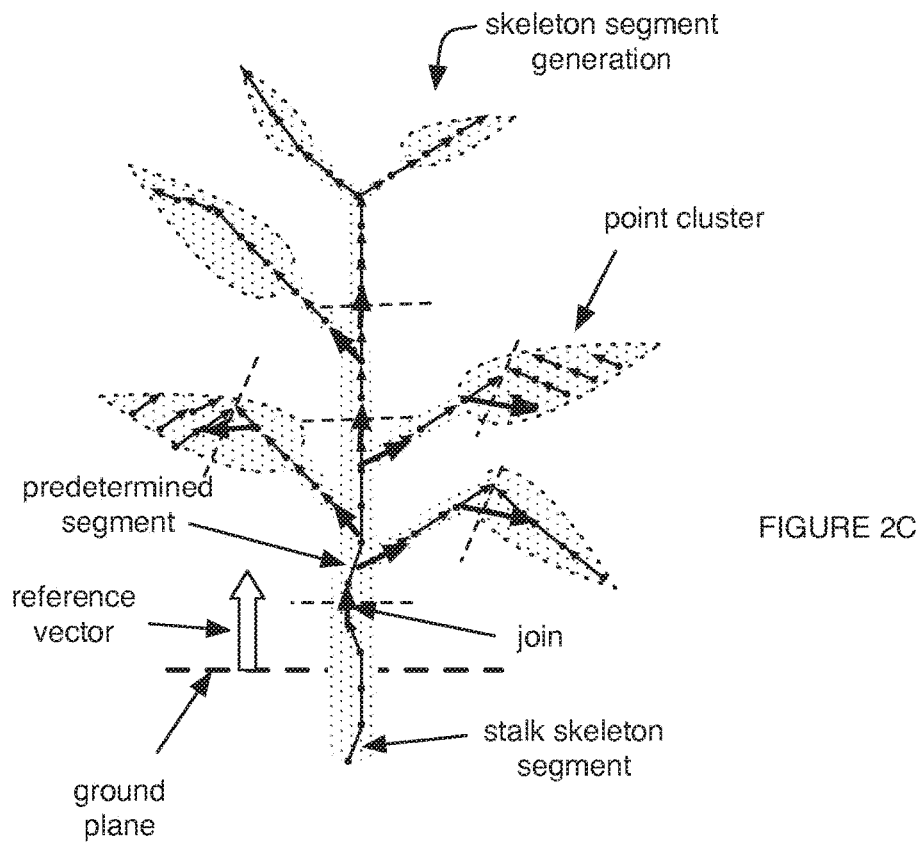
FIGURE 2C

SYSTEM AND METHOD OF VIRTUAL PLANT FIELD MODELLING

CROSS REFERENCE TO RELATED APPLICATIONS

This application is a continuation of U.S. patent application Ser. No. 15/996,810, filed on Jun. 4, 2018, allowed, which is a continuation of application U.S. patent application Ser. No. 15/157,997, filed on May 18, 2016, allowed, which claims the benefit of U.S. Provisional Application No. 62/163,147, filed May 18, 2015, all of these applications are incorporated herein by reference in their entirety for all purposes.

GOVERNMENT RIGHTS LEGEND

This invention was made with government support under Phase II SBIR contract NSF #1256596 with the National Science Foundation. The government has certain rights in the invention.

TECHNICAL FIELD

This description relates generally to the precision agriculture field, and more specifically to a new and useful virtual plant model generation system in the precision agriculture field.

BACKGROUND

Identifying plants from captured images is beneficial for a number of agricultural purposes. However, individual plants are generally planted close in proximity to each other in order to maximize a desired outcome (e.g., maximize yield, protein percentage, or some other measurable quantity) while minimizing the amount of land that is needed to grow the crops. Based on this, it is common for the leaves, branches, and other growths of a plant to overlap with other nearby plants. As these growths are usually both numerous and roughly similar in appearance from plant to plant, existing image recognition systems experience difficulty when trying to identify plant matter than may appear to belong to multiple nearly overlapping plants. Often, they will mischaracterize plant growths as belonging to the wrong plant, or will misidentify how many plants are present in the field.

BRIEF DESCRIPTION OF THE FIGURES

FIGS. 2A, 2B, and 2C are schematic representations of a first, second, and third example of growing plant skeletons based on the skeleton segments classified as stalk bases.

DETAILED DESCRIPTION

I. Overview

Figure 7:
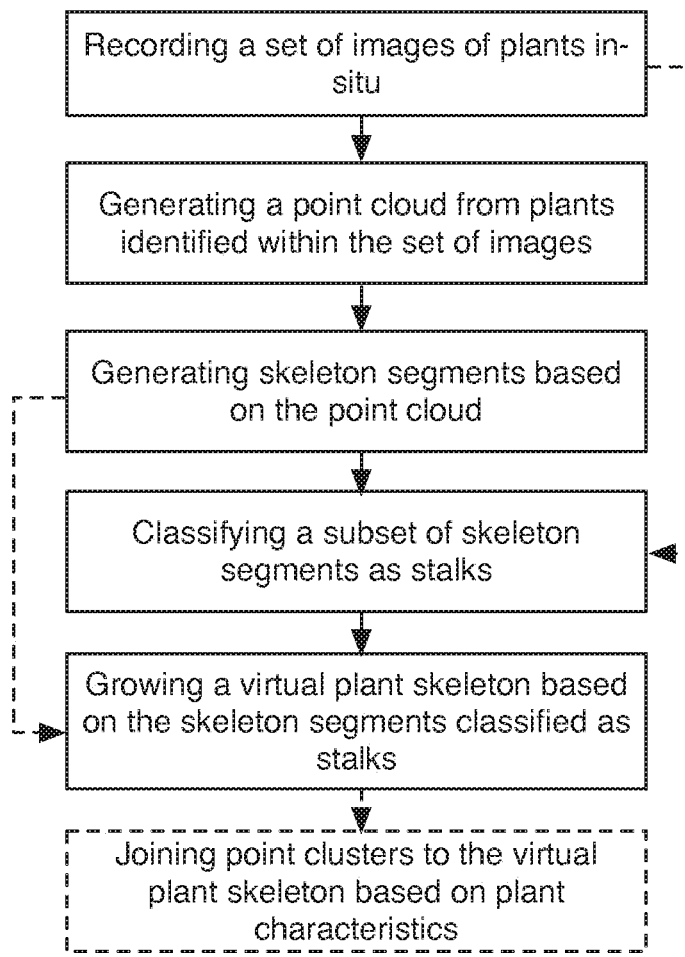
FIG. 7 is a flow diagram representation of an example method for generating a virtual plant model.

As shown in FIG. 7, an example method for generating virtual models of plants in a field includes a number of steps that detect the presence and position of a unique plant feature within a 2D or 3D point or voxel space to serve as a starting point for creating a virtual model for an individual plant. In the example of this description, the unique plant feature is a stalk base, however in other implementations other unique plant features may be used, such as the stalk itself, a location of where the stalk is planted in the ground, a flower, a trunk, an ear, a meristem, etc.

The steps of the example method include recording a set of images of a set of plants in-situ; generating a point cloud from plants identified within the set of images; generating skeleton segments from the point cloud; classifying a subset of skeleton segments as stalk bases (or another unique plant feature) using the set of images; and growing plant skeletons from skeleton segments classified as stalk bases (or, again, another unique plant feature).

The method may be used to generate a virtual model of a single, real plant, a portion of a real plant field (thus virtual models many real plants), and/or the entirety of the real plant field. In a specific example, the method builds a virtual model of a corn field, wherein the virtual model includes a virtual structure for all or most of the detected corn plants within the corn field.

The virtual model can be analyzed to determine or estimate plant population parameters, such as density, number of plants within the plant field, average plant size, and plant uniformity, and terminal yield. The virtual model can also be analyzed to determine or estimate individual plant parameters, such as biomass, uniformity, susceptibility to nutrient, water, or biotic stress, leaf area index, biomass, plant temperature, stalk diameter and height, vigor, and possibly terminal yield on a plant-by-plant basis. The virtual model can also be used in aggregate across multiple plants to determine quantities such as stand count and aggregate yield. The virtual model can also be used for predictive purposes. In one example, one or more scenarios, such potential treatments or thinning practices, can be applied to the virtual model. The future values for yield, plant uniformity, or any other parameter can be determined from the projected results based on the virtual model.

The method can be performed and/or the virtual model dynamically generated in real- or near-real time. For example, the method can be performed as the recording and/or computing system for capturing images and performing the method travels along the field and/or as the imaging system is recording subsequent images, or 3D data. Alternatively, the method can be performed asynchronously with information collection (e.g., after all field images have been recorded), or be performed at any other suitable time. The virtual model can be generated by an in-situ system (e.g., the imaging system), by a remote system, or by any other suitable system.

The method has a number of benefits. As will be described further below, the method can decrease computation time and/or resources by identifying stalk segment candidates using the virtual model, but classifying the segments as stalks or non-stalks using the images (e.g., by using a hybrid approach). In particular, the method can enable quick navigation through a downsampled point cloud to identify the stalk candidates, where the downsampled point cloud can contain insufficient information for the image classification system, neural network, and/or other classification system to reliably classify the segments as stalks. The images, which have enough information for the neural network to reliably classify the segments, corresponding to the stalk segment candidates can then be used to classify the segments. This can increase the computation speed over pure virtual plant models because a downsampled point cloud can be used. This can increase the computation speed over pure image-based methods because the virtual model is used to decrease the number of image segments to be considered by the neural network. Second, the method can oversegment the plant when generating the initial skeleton segments. This can function to distinguish overlapping plants.

II. Image Collection

An imaging system records a set of images of a set of plants in-situ to gather the raw information which can be used to generate point clouds, generate skeleton segments for classification, for plant parameter determination, or for any other suitable function. The images are preferably recorded in real time, as the system traverses through a real (physical) plant field (e.g., geographic region), but can alternatively be recorded after the system stops (e.g., within the field), or be recorded at any other suitable frequency or time.

A recorded image can be a 2D image, a 3D image, a depth image, a scan (e.g., laser scan, ultrasound visualization, etc.), or be any other suitable image. The image can be collected using a variety of techniques, including ambient light imaging, laser imaging (LIDAR), hyperspectral imaging, radar imaging, etc. The wavelengths of light captured may include wavelengths in the visible range, near infrared range, and thermal (mid IR) range. The image can be a composite image (e.g., generated from a first and second image), a single image, a mosaicked image (e.g., compiled from multiple images), or be any other suitable image. The image preferably captures (and/or the imaging system field of view is arranged such that the recorded image includes) both a portion of the ground and a portion of the plant. In one example, the image captures a ground plane and the plant stalk or leaves proximal the ground. The image can capture the entirety of the plant, a subsection of the plant, or capture any other suitable portion of the plant. In one variation, the set of images can only capture the portion of the plant proximal the ground. In a second variation, the method can include recording and processing a second set of images capturing the portions of the plant distal the ground, wherein the second set of images or resultant virtual model can be merged with the first set of images or first virtual model based on the geographic location of the images. Each image can capture features from one or more plants.

Figure 6:
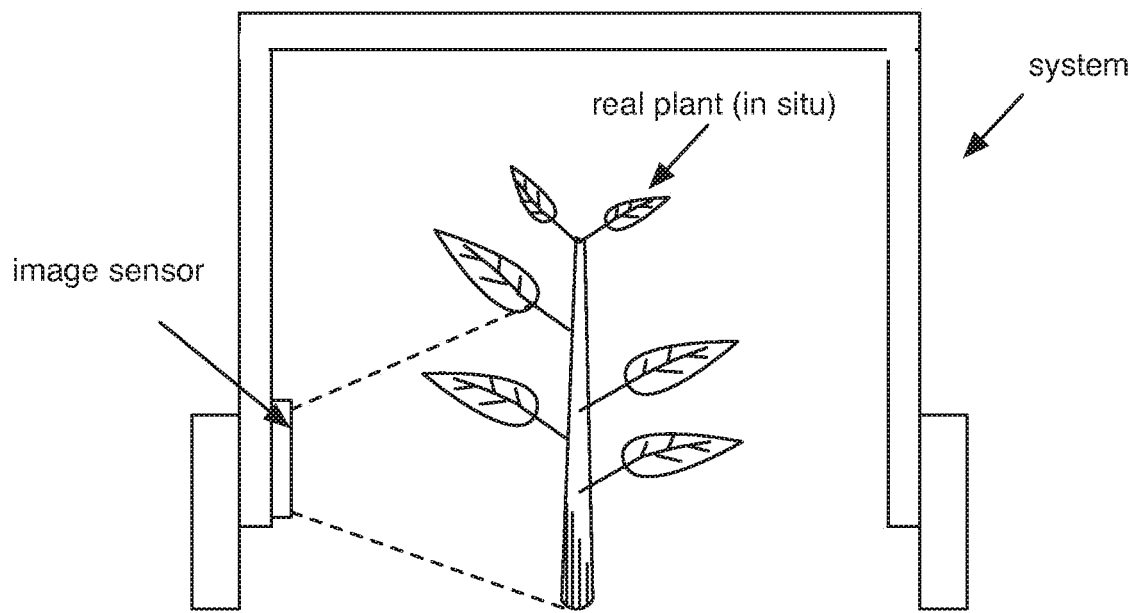
FIG. 6 is a schematic representation of an example of the terrestrial system.

The images are recorded by an imaging system. The imaging system can be arranged on a ground-based (terrestrial) system (e.g., as shown in FIG. 6), wherein the system can additionally include treatment mechanisms, computing systems, communication systems, or any other suitable subsystem. Alternatively, the imaging system can be an aerial system, aquatic system, or be any other suitable system. The imaging system can be a 2D imaging system, 3D imaging system, or be any other suitable imaging system. Examples of the imaging system include contact systems, non contact active systems (e.g., time of flight, triangulation, conoscopic holography, etc.), structured light systems, modulated light systems, non-contact passive systems (e.g., stereoscopic, photometric, silhouette, etc.) or any other suitable system. The imaging system may be configured to record a side view of the plants (e.g., wherein the imaging system is angled along a vector having a projection that is either perpendicular to a gravity vector or is at least at a non-zero angle with respect to the gravity vector), but can alternatively be configured to record a top-view of the plants, record both a side and a top view of the plants, or record an image of the plant from any other suitable angle. The system can include one or more imaging systems arranged in one or more positions. The system can additionally include a light shield or other ambient light shading element to create more controlled lighting environment. Alternatively, the system can be open to the ambient environment (e.g., record images at least partially using ambient light). In one variation, the imaging system can be substantially similar to that disclosed in U.S. application Ser. No. 14/329,161, filed 11 Jul. 2014, incorporated herein in its entirety.

III. Point Cloud Generation

Figure 1A:
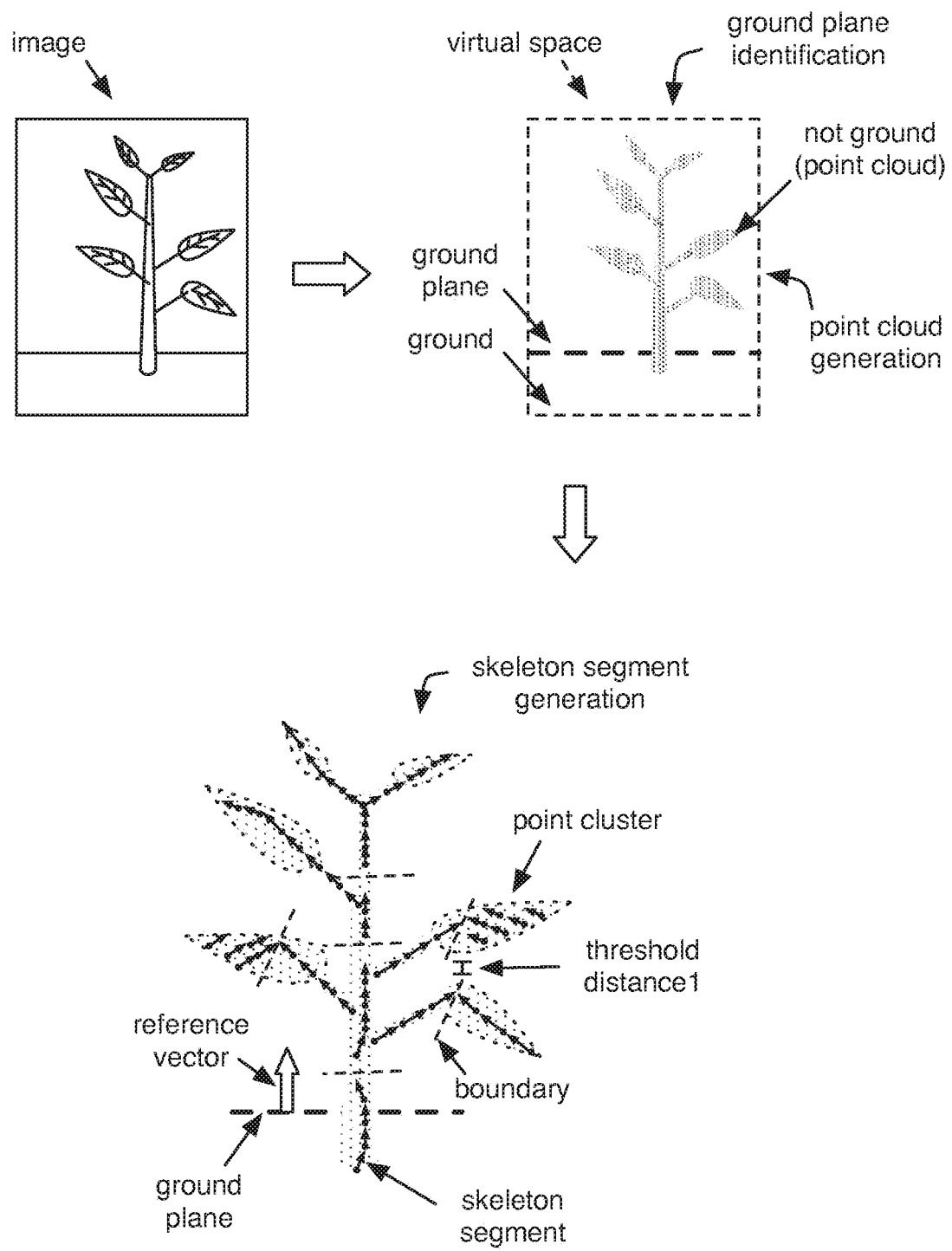
FIG. 1A is a schematic representation of an example of generating a point cloud from plants identified within the set of images and generating skeleton segments from the point cloud.

As shown in FIG. 1A, the imaging system uses the set of images to generate a point cloud from plants identified within the set of images. The point cloud virtualizes/reduces an image to a set of virtual points, which functions as the basis from which the virtual model of a plant can be built. The point cloud may be a 3D point cloud (e.g., a set of points arranged in a 3D virtual space), a depth map, 2D point cloud, or be any other type of point cloud. The point cloud can be generated using pattern recognition on the image segments for which the cloud is to be generated, generated from a pattern projected onto the geographic region, or be otherwise generated.

Generating the point cloud can additionally include identifying the ground within the image (identifying the ground plane), as shown in FIG. 1A. The ground plane is preferably represented in the virtual model, such as by a set of points, a vector, a plane, or a volume, but can alternatively remain unrepresented or be otherwise noted. The ground plane location can subsequently be used as a reference point for skeletonization and stalk candidate identification. The ground plane can be identified based on a set of predetermined features (e.g., determined by a trained machine learning module, determined as a substantially straight line, etc.), determined based on ground plane segmenting techniques (e.g., using a corner based approach, color cues, Gaussian Mixture Model based segmentation method, etc.), determined from the foreground, or identified in any other suitable manner.

Generating the point cloud can additionally include identifying plants within the image, as shown in FIG. 1A. The plants can be identified as foreground features that do not qualify as the ground plane, identified based on a set of predetermined features (e.g., determined by a trained machine learning module, etc.), or be identified in any other suitable manner.

In one variation, the point cloud is generated for the entire image, wherein points corresponding to background, plant matter, and ground can be subsequently determined after the point cloud is generated. In a second variation, generating the point cloud includes segmenting the foreground from the background), generating the point cloud for the foreground, then identifying the ground plane and the plant. In a third variation, generating the point cloud includes identifying a ground plane within the set of images; identifying plants within the set of images; and generating point clouds from the plants identified within the images.

IV. Skeleton Segment Generation

Generating skeleton segments from the point cloud functions to generate preliminary plant segments, such that stalk candidates can be subsequently identified from the preliminary plant segments. Generating the skeleton segments preferably functions to generate a plurality of virtual skeleton segments separated by virtual boundaries, but can alternatively generate a single skeleton, or generate any suitable number of skeleton segments. Generating the skeleton segments preferably over segments the plants, wherein each plant is segmented into a plurality of segments, but can alternatively under-segment the plants (e.g., wherein two plants are part of the same skeleton segment), or otherwise segmented. Each segment preferably includes one or more connected nodes. The nodes can be points, voxels, or any other suitable virtual unit. The nodes are preferably connected by vectors, such that the segment forms a pointer structure, but can alternatively be connected by lines (e.g., without an associated direction), or be connected in any other suitable manner.

In one variation, the method can additionally include identifying nodes. In a first variation, the nodes can be the points of the generated point cloud. In a second variation, identifying nodes can include generating voxels from the point cloud, wherein the nodes can subsequently be one or more of the generated voxels. This can additionally function to downsample the point cloud. Each voxel preferably represents a volume of virtual space, but can alternatively represent a 2D section of virtual space or represent any other suitable unit of virtual space. The voxels can be generated by clustering points within a threshold distance of each other (e.g., within 1 millimeter, 1 centimeter, etc.) and defining a voxel about the clustered points, segmenting the virtual space covered by the point cloud into a uniform voxel grid (e.g., wherein each voxel is substantially the same size), segmenting the virtual space covered by the point cloud into a voxel grid, wherein each voxel encloses the same number of points (e.g., to normalize the points per volume between images of objects close to the camera and distal from the camera), or be generated in any other suitable manner.

Generating skeleton segments from the point cloud can include identifying starting nodes and growing the skeleton from the starting nodes, as shown in FIG. 1A. However, the skeleton segments can be generated using curve skeletonization (e.g., medial axis skeletonization of surface elements generated from the nodes, skeletonization of the distance field, skeletonization of the geodesic field, Voronoi diagram extraction, topology preserving iterative erosion, topological thinning, distance transform based technique, Laplacian based contraction, etc.), Blum's grassfire transform, morphological operators, morphological operators and shape-based pruning, intersections of distances from boundary sections, curve evolution, level sets, finding ridge points on the distance function, shape peeling until convergence without topology change, surface skeletonization, iterative skeleton expansion (e.g., by iteratively adding new branches that connect the furthest voxel to the current skeleton using a minimum cost geodesic path), or be generated in any other suitable manner.

Identifying starting nodes functions to identify nodes from which the skeleton is grown. The starting node can be the node closest to the ground plane, such that the node is not connected to a second node on the side closest to the ground plane; nodes within a threshold virtual distance of the ground plane (e.g., 1 virtual meter, 1 virtual centimeter, etc.); edge nodes; nodes further than a threshold distance (virtual or real) from the next closest node (neighboring node) (e.g., 1 virtual centimeter, 1 virtual meter, etc.); nodes closest to or overlapping the ground plane; or be nodes having any other suitable characteristic.

Growing a skeleton segment from a starting node functions to generate a set of preliminary plant segments. The skeleton segment can be linear, be a surface, be a volume, or have any other suitable dimensionality. Each skeleton is preferably grown based on plant-specific characteristics (e.g., grown upwards away from the ground, only joined to nodes within a threshold distance, such as within 1 virtual centimeter, etc.), but can be grown based on any other suitable set of rules. The skeleton segment can be grown by iteratively joining nodes to the last node of the skeleton stemming from a starting node. The joined nodes are preferably virtually located within a threshold distance of the last node (e.g., within a virtual centimeter, meter, etc.), and located further away from the ground plane than the last node. One or more skeletons can be generated from each starting node. The skeletons from each starting node are preferably kept separate, but can alternatively join (e.g., such that a skeleton can stem from multiple starting nodes).

In one example, as shown in FIG. 1A, the node is only joined to the skeleton if the vector joining the first and second nodes has a non-zero projection on a reference vector. The reference vector can be an measured or estimated gravity vector (e.g., as determined from the image, measured by an accelerometer, determined from the orientation of the recording image sensor, etc.), be a vector extending at an angle to the ground plane (e.g., normal to the ground plane, etc.), or be any other suitable reference vector. Skeleton growth can terminate when no other nodes satisfy these two conditions. This functions to generate virtual segments indicative of plant structures, such as stalks, leaves, and stems. Alternatively, the joined node can be the nearest node neighboring the last node of the skeleton segment, be joined using geodesic field generation, be joined based on a cost function, or be joined in any other suitable manner. However, the skeleton segments can be otherwise generated.

V. Downsampling

Figure 3:
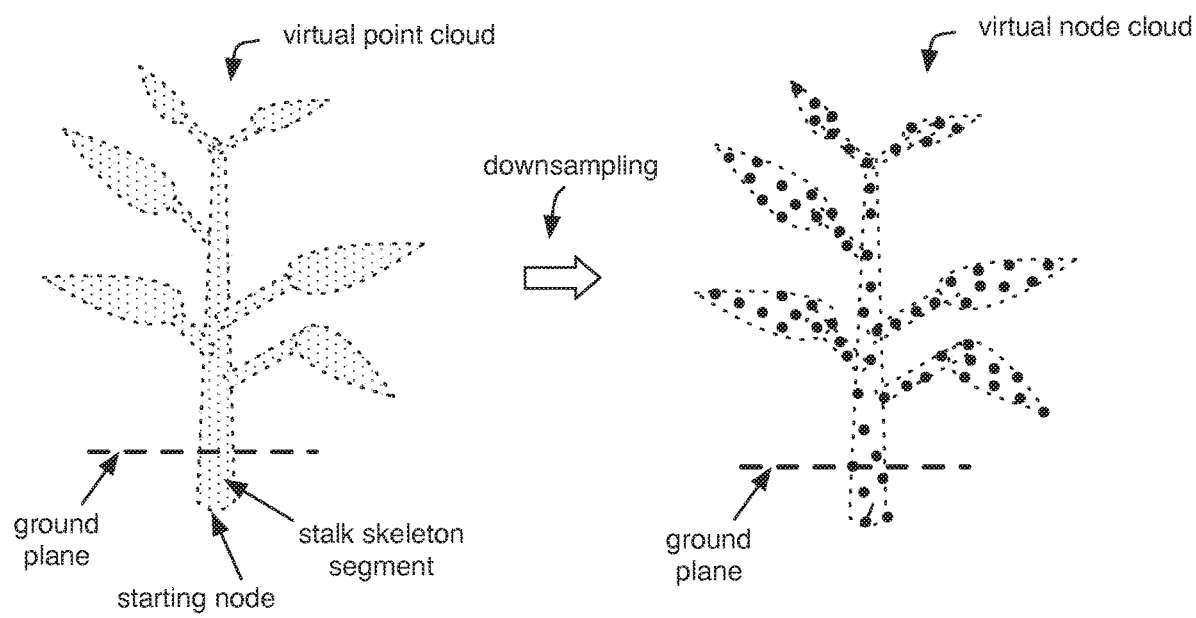
FIGS. 3 and 4 are schematic representations of a first and second example of downsampling the point cloud.
Figure 4:
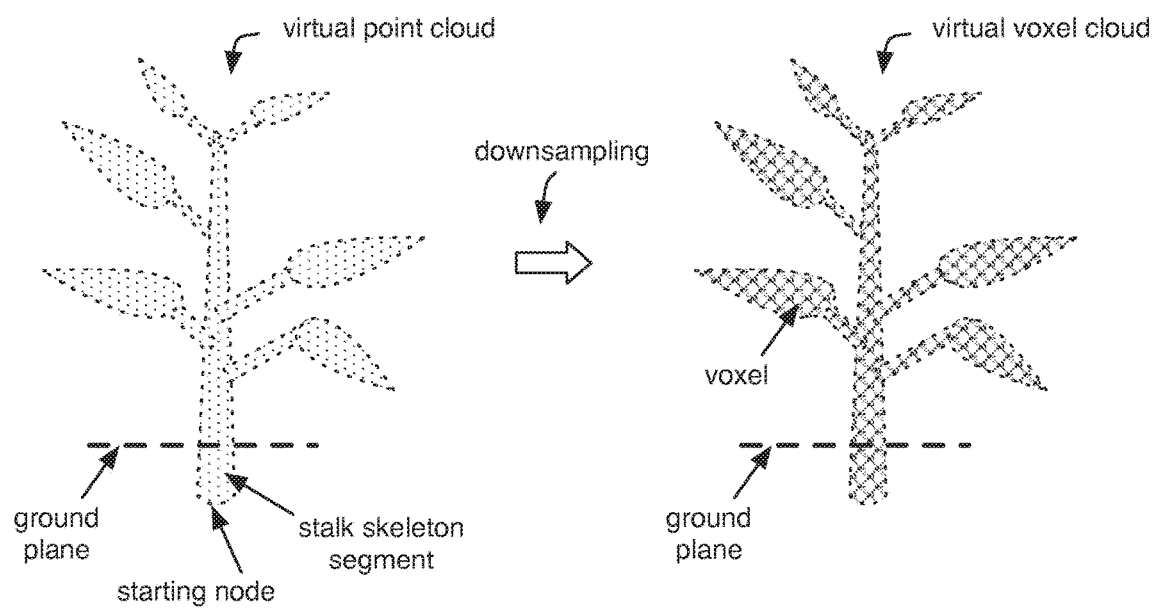

The method can additionally include downsampling the point cloud, such that a reduced number of points and/or skeleton segments can be considered at later stages of the method. The point cloud can be downsampled before the skeleton segments are generated, after the skeleton segments are generated, or be downsampled at any other suitable time. In a first variation, point cloud can be downsampled by generating voxels from the point cloud, as discussed above (example shown in FIG. 4). In a second variation, the point cloud can be downsampled by clustering points within a threshold virtual distance together (example shown in FIG. 3). However, the point cloud can be downsampled by using a geodesic tracing technique, pruning, or applying any other suitable downsampling method. In a first variation, the plurality of skeletons generated from the starting nodes can be downsampled by selecting the best fit skeleton for the estimated plant section. In a second variation, the skeletons can be downsampled based on a cost function minimization, wherein a skeleton can have a higher cost if the skeleton is unbalanced (e.g., is biased heavily to one side), deviates from the set of typical profiles (e.g., straight lines, as exhibited by stems, loose curls as exhibited by leaves, etc.), or has any other suitable unusual plant characteristic. However, the skeletons can be otherwise downsampled.

VI. Plant Stalk Identification

Figure 1B:
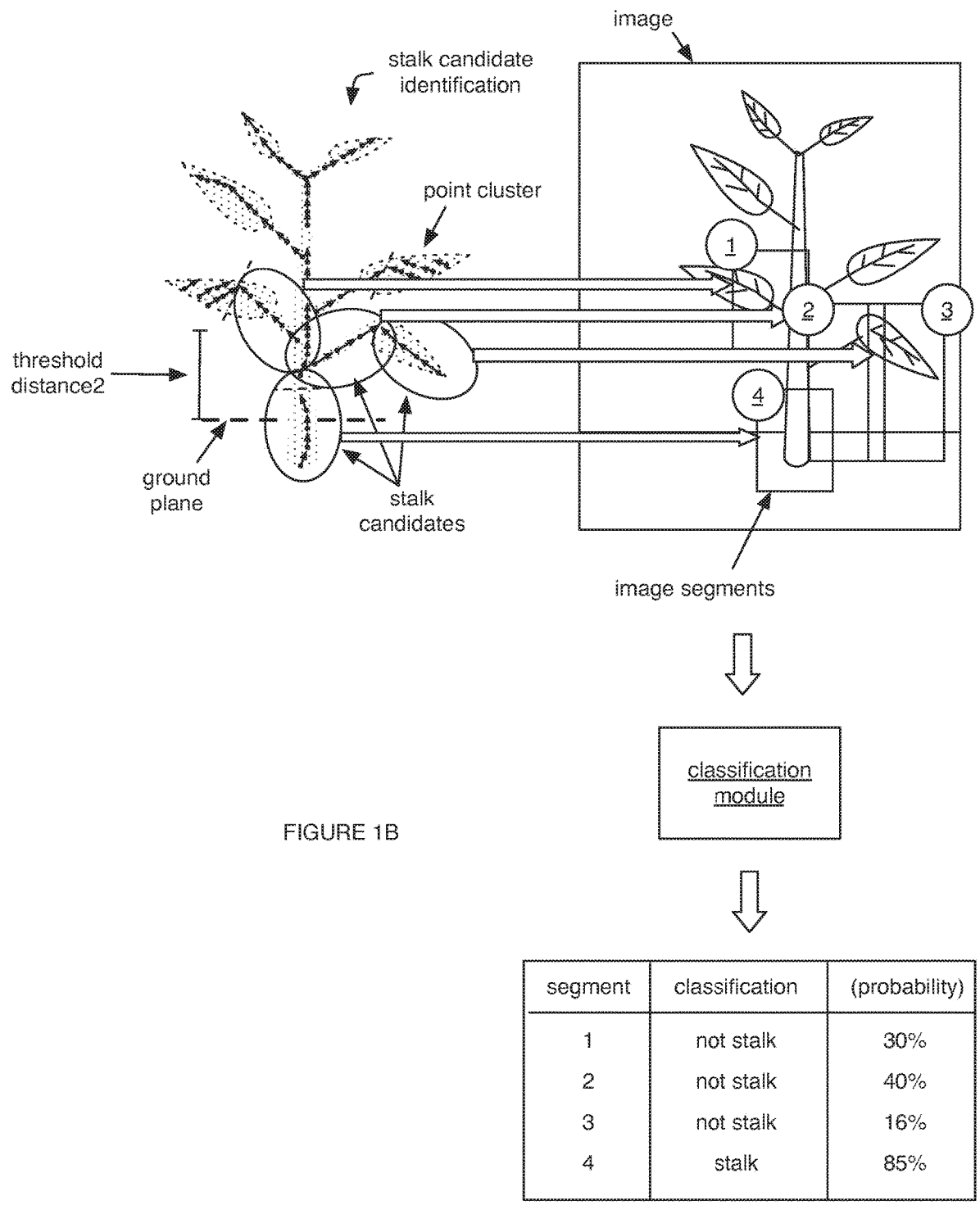
FIG. 1B is a schematic representation of an example of classifying generating skeleton segments as stalk bases using the set of images.

Classifying a subset of skeleton segments as stalk bases identifies the starting nodes and/or starting skeleton segments from which the virtual plant model should be generated. This enables the final plant skeleton to be generated from the bottom up (e.g., from the stalk up). Classifying a subset of skeleton segments as stalk bases can include: identifying the skeleton segments proximal the ground plane; identifying sections of the image corresponding to the identified skeleton segments; and identifying stalks from the identified image sections, an example of which is shown in FIG. 1B. However, the skeleton segments can be categorized as stalk bases based solely on the virtual model (e.g., based on the skeleton segment vector field, based on the geodesic structures formed by connecting the virtual nodes, etc.) or be categorized as stalk bases in any other suitable manner. Alternatively, the method can include classifying a subset of skeleton segments as plant apexes (e.g., plant tops), wherein the skeleton segments and subsequent final plant skeleton can be determined from the top down. However, the skeleton segments can be otherwise classified, and the virtual plant model otherwise generated.

Identifying the skeleton segments proximal the ground plane functions to identify skeleton segments that potentially represent real plant stalks within the virtual space. The stalk candidates are preferably identified in the virtual space because the virtual model is faster and requires less computational power to sort through, as compared to stalk candidate identification from images, but the stalk candidates can be identified in any other suitable manner. The skeleton segments identified as potential candidates can be: skeleton segments at least partially located within a threshold virtual distance of the ground plane; skeleton segments that intersect with or touch the ground plane; skeleton segments satisfying a set of stalk conditions (e.g., have a threshold thickness, variable dependent upon the stage of plant growth, have a threshold straightness, etc.); or be any otherwise selected.

Identifying sections of the image corresponding to the identified skeleton segments functions to identify high-resolution pieces of information suitable for use in classification. This can be desirable because, in some variations, the skeleton segments are downsampled to increase candidate identification speed, and therefore do not contain sufficient information for the classification module to reliably classify the segment. Furthermore, because the potential stalk candidates and/or corresponding volumes have already been identified using the virtual model, the method can reduce the number of image sections that need to be processed by focusing only on the image sections corresponding to the stalk candidates and surrounding areas, and ignoring the remainder of the image. This can translate to faster computation time and/or a smaller computation power requirement.

In one variation, an entire image corresponding to the virtual stalk candidate can be identified. In a second variation, a section of the image (e.g., less than the entire image) corresponding to the virtual stalk candidate can be identified. In a third variation, all images associated with the geographic volume associated with the stalk candidate can be identified. However, any other suitable image portion can be identified.

The identified image section preferably encompasses the entirety of the corresponding virtual stalk candidate (identified skeleton segment), but can alternatively encompass a portion of the corresponding virtual stalk candidate (e.g., the top, bottom, or middle), or encompass any other suitable portion of the virtual stalk candidate. The image section preferably includes a portion of the ground plane proximal the corresponding virtual stalk candidate, but can alternatively exclude the ground plane. The image section is preferably wider than the corresponding virtual stalk candidate, such that the image includes a portion of the ambient environment next to the virtual stalk candidate, but can alternatively be as wide as the corresponding virtual stalk candidate (e.g., cropped at the virtually defined stalk boundaries) or be thinner than the corresponding virtual stalk candidate.

In one variation, the image section size can be dynamically determined based on the virtual dimensions of the virtual stock candidate. In a second variation, the image section size can be predetermined (e.g., fixed). However, any other suitable portion of the image can be identified as the image section.

The identified image sections preferably correspond to the virtual stalk candidate. In one variation, the image section correspondence with the identified skeleton segment is determined based on substantially matching respective geographic identifiers. For example, a virtual stalk candidate can be associated with a set of geographic locations (e.g., latitude/longitude coordinates, altitude, etc.) based on the base image(s) from which the model was generated, wherein the identified image section is also associated with substantially the same or a larger set of geographic locations. The geographic locations can be associated with the virtual model and/or images using odometry systems, such as the one disclosed in U.S. application Ser. No. 14/629,361 filed 23 Feb. 2015, incorporated herein in its entirety by this reference. However, geographic locations can be otherwise associated with the image section and virtual model. In a second variation, the image section correspondence with the identified skeleton segment is determined based on the location of the skeleton segment within the source image(s) from which the nodes in skeleton segment was generated. For example, the image section can be identified by aligning a virtual reference point with a corresponding reference point on the source image and identifying the image section that overlaps with the stalk candidate. The virtual reference point can be a vector, point, volume, or other reference point. The image reference point can be an image edge, image pixel (e.g., arranged at a predetermined location relative to the image edges or center), or be any other suitable reference point. Alternatively, the reference point can be a plant feature represented in the virtual space and the image. However, any other suitable reference point can be used.

The identified image is preferably a set of images, including a left image and a right image of the plant section corresponding to the virtual stalk candidate. The left and right images can cooperatively form a depth image, wherein a segment of the depth image can be identified and used to classify the stalk candidate. Alternatively, the set of images can additionally or alternatively include a depth image (e.g., a scan, stereoscopic image, etc.) composited with the other images, wherein the depth image can be recorded from the same or similar angle (relative to the plant) as the right and left images, or be recorded from a different angle (e.g., from the top of the plant). Alternatively, a single image or any other suitable set of images can be used. The images are preferably those used to generate the point cloud, but can alternatively be different images.

Identifying stalks from the identified image sections functions to classify each virtual stalk candidate as a plant stalk or non-stalk. However, the candidate skeleton segments can additionally or alternatively be classified as dualities (e.g., as single plants, two plants, multiple plants, etc.), leaves, or be otherwise classified. The virtual stalk candidates are preferably automatically classified by a classification module running on the in-field system or a remote system, but can alternatively be classified in any other suitable manner. The classification module can simultaneously classify multiple stalk candidates, a single stalk candidate, or concurrently classify any number of stalk candidates. The classification module is preferably a convolutional neural network (CNN), but can alternatively or additionally be a deep neural network (DNN), feedforward neural network, radial basis function (RBF) network, Kohonen self organizing network, Learning Vector Quantization, recurrent neural network, modular neural network, physical neural network, holographic associative memory, instantaneously trained network, spiking neural network, dynamic neural network, cascading neural network, neuro-fuzzy network, compositional pattern-producing network, or be any other suitable artificial neural network. However, the classification module can be any other suitable machine learning module (e.g., including SIFT features with the support vector machine [SVM]), or be any other suitable classification module.

VII. Building a Plant Virtual Model

Growing plant skeletons from skeleton segments classified as stalk bases functions to generate the finalized virtual plant representations. The plant skeleton is preferably virtually grown from the skeleton segments classified as stalk bases by the classification module (examples shown in FIG. 2A, FIG. 2C), but can alternatively be grown from any other suitable set of skeleton segments. Alternatively, the plant skeleton can be virtually grown from the starting nodes of the skeleton segments classified as stalk bases (example shown in FIG. 2B), or be grown from any other suitable virtual structure. The plant skeleton can be iteratively generated, selected from multiple different plant skeletons candidates (e.g., based on the respective probability that the skeleton candidate represents a plant), or determined in any other suitable manner. The plant skeleton can be selected from the plurality of possible skeletons to maximize the plant probability for each plant, for the virtual plant population, or be selected in any other suitable manner.

In one variation, an example of which is shown in FIG. 2C, the finalized plant skeleton is generated from the previously generated skeleton segments. The plant skeleton can be iteratively generated upwards from the stalk skeleton by joining skeleton segments within a threshold distance of the last plant skeleton segment (e.g., within a virtual centimeter, meter, number of voxels, such as one voxel, etc.). In a specific example, subsequent skeleton segments can be iteratively joined (e.g., virtually annealed) to the last segments of the skeleton when the subsequent segment is within a threshold virtual or real distance (different or similar to the threshold distance used to generate the segments) of the last skeleton segment, and/or when the subsequent segment is further than the last segment from the ground plane. Alternatively, the subsequent segment can be joined when the subsequent segment is further from the starting segment than the last segment. Additionally or alternatively, the subsequent segment can be joined when the probability that the resultant skeleton represents a plant (e.g., based on the skeleton shape uniformity, position of the resultant center of mass, resultant plant size as compared to an expected plant size based on the actual or estimated growth stage, etc.) is beyond a threshold probability (e.g., 75%, 90%, etc.). This can enable the virtual model to represent plants that do not stand entirely upright. However, the plant skeleton can be otherwise annealed. Subsequent skeleton segment joining can be halted when the next segment is beyond the threshold distance, or when any other suitable joining condition is failed.

In a second variation, the plant skeleton can be entirely re-generated, wherein a new skeleton can be virtually grown, independent of the previously generated skeleton segments (example shown in FIG. 2A). The new skeleton can be grown from the starting node of the old skeleton segment that was classified as a stalk, grown from the skeleton segment classified as a stalk (e.g., wherein the skeleton segment is the only re-used virtual component), or be otherwise generated.

Growing the virtual plant skeleton can additionally include joining point clouds or voxel groups representative of leaves, fruit, or other plant components to the plant skeleton (example shown in FIG. 2A). The virtual plant component representation can be joined as part of the final plant skeletonization process, or be joined after the plant skeleton representative of the stalk and/or stems is finalized. In one variation, the virtual plant component representation is treated the same as all other plant segments. In a second variation, the virtual plant component representations are classified as non-stalk or non-stem (e.g., by a classification module), segmented out of the virtual model used to generate the plant skeleton, then reconsidered after the plant skeleton has been generated. Each plant cluster is preferably joined to a single plant skeleton, but can alternatively be joined to multiple plant skeletons. The plant clusters can be joined to the closest plant skeleton (e.g., touching or within a threshold distance), be joined based on the probability that the resultant virtual plant is representative of a real plant (e.g., based on the resultant center of mass, shape uniformity, size of the cluster relative to the size of the stalk, etc.), or be joined based on the satisfaction of any other suitable characteristic. In one variation, multiple virtual plant options (each with a different combination of joined clusters) can be generated for each plant skeleton, wherein the plant option with the highest probability of representing a real plant can be selected. Alternatively, the plant options maximizing the probability that the virtual plant population represent real plants are selected. In a second variation, a single virtual plant with a single cluster combination can be generated. However, the clusters can be otherwise joined to the virtual plant skeleton.

VIII. Using the Unique Plant Features and Plant Virtual Models

Figure 8:
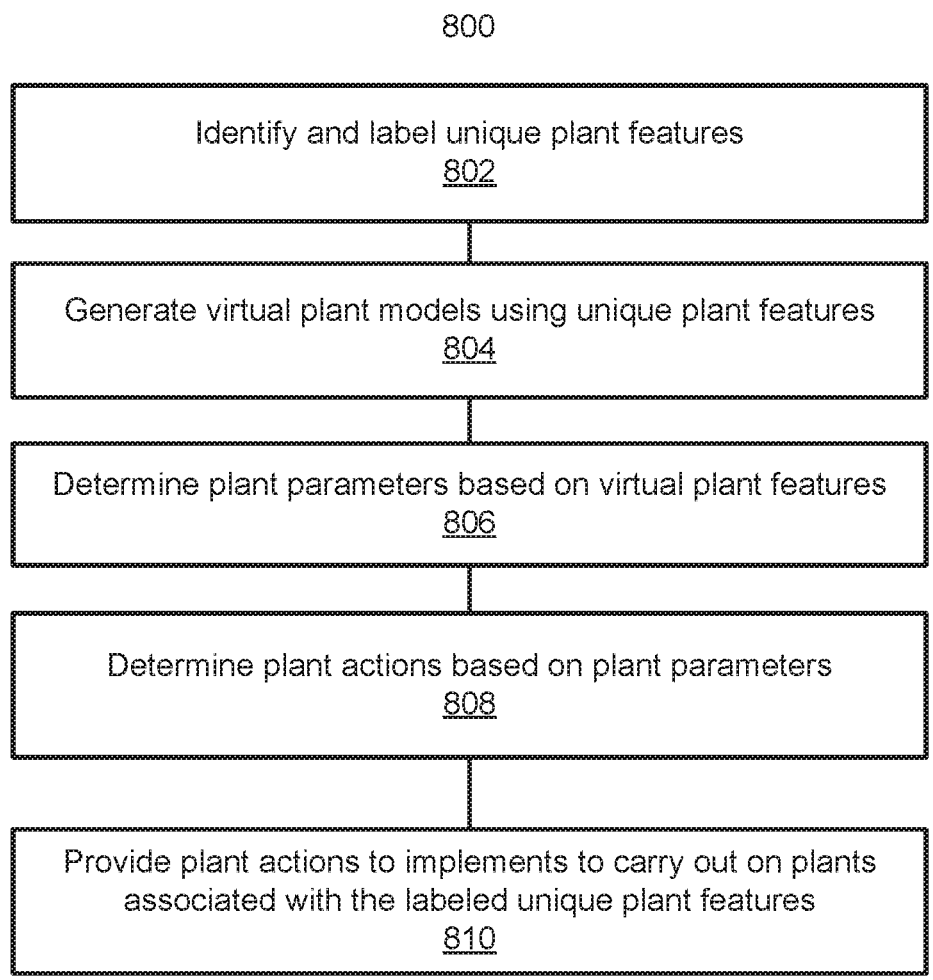
FIG. 8 is an example process for using labeled stalk bases of plants (or another unique plant feature) to carry out actions with respect to those plants.

FIG. 8 is an example process 800 for using labeled stalks of plants to carry out actions with respect to those plants. As discussed in the overview, once the positions of the unique plant features, such as stalks or stalk bases, are known 802 other analyses or processes may be carried out based on the information. These include, for example, generating three-dimensional models of plants growing in the field, assessing plant growth and phenotypic features, determining what kinds of treatments to apply including both where to apply the treatments and how much, determining whether to remove weeds or other undesirable plants, and so on. The position in the field of unique plant features, and thus each individual plant, is the starting point for performing any of these processes on a plant-by-plant basis.

Figure 5:
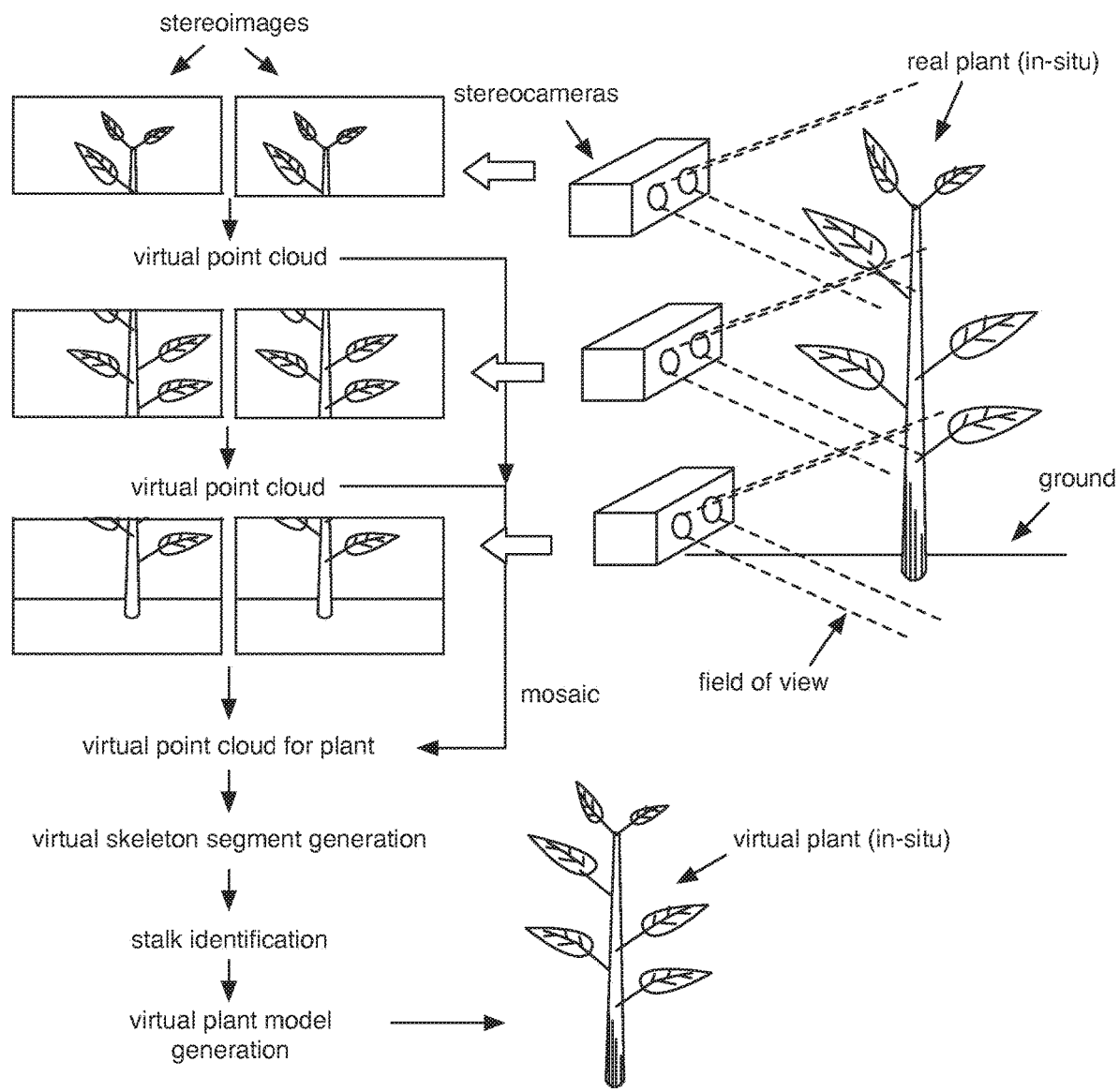
FIG. 5 is a schematic representation of an example of recording a set of stereoimages for a plant, and performing the method using the stereoimages.

As one exemplary embodiment, FIG. 8 illustrates that the locations of the unique plant features 802 may be passed as an input to plant modeling computer code 804 as described above. Modeling may further include mosaicking the generated models, such that a virtual model of a geographic region can be generated from multiple images of geographic region sub-plots. In one variation, the images can be mosaicked (e.g., based on geographic location, estimated image position relative to the preceding image, reference points within the image, etc.), such that the point cloud on which the method is performed is already representative of the entire geographic region to be modeled. In a second variation, an example of which is shown in FIG. 5, the virtual plant models can be individually generated or be generated in subsets. Multiple individual virtual plant models and/or plant model subsets can be subsequently merged or arranged within the virtual space based on the relative locations of the respective underlying images. However, the virtual model of the plant field can be otherwise generated.

The virtual model is accessed by plant analysis computer code that analyzes 806 the virtual model to identify plant parameters of individual plants, and/or aggregate statistics regarding the modeled plants. The plant parameters are preferably determined solely from the virtual model, but can alternatively be verified or cooperatively determined based on the underlying source images. Aggregate statistics may be generated for a plant and a subset of its nearest neighbors, an entire row of plants, an entire field of plants, or any sub-zone thereof. Examples of aggregate plant parameters that may be identified include plant density, a number of plants within the plant field, plant size (e.g., average height, median height, height distribution over a population of plants), plant greenness (e.g., based on the colors in the image pixels corresponding to the virtual plant), and plant uniformity, and terminal yield. Examples of individual plant parameters include biomass, greenness, uniformity, leaf area or volume (e.g., based on the volume or surface area of the point clusters representative of leaves), susceptibility to nutrient, water, or biotic stress, leaf area, stalk diameter (e.g., based on the virtual diameter of the plant skeleton), height, and terminal yield on a plant-by-plant basis.

The individual or aggregate plant parameters are accessed by plant action computer code that analyzes 808 the parameters to determine what action to take with respect to the plants in the field. These determinations may be made on the basis of parameters of individual plants, such that separate and different action can be taken on each individual plant in the field. These determinations may also be made on the basis on aggregate parameters of more than one plant, such as the parameters of a plant and its nearby neighbors, or in aggregate across an entire row, field, or any sub-zone thereof. The determined actions 808 may include potential treatments, such as the application of fertilizer, pesticides or other chemicals. The determined actions 908 may also include thinning practices, such as the removal of plants identified as weeds, or thinning to remove undesired plants.

The determined actions may be provided 810 to a physical implement (not shown) attached to a device (e.g., tractor, combine, other vehicle, UAV, etc.), to carry out the determined action. For example, if the determined action is a chemical application, the provided action may include timing of when to spray, what chemical to spray, how much to spray, for how long, and at what flow rate. The implement may then carry out 810 the determined action. Alternatively, in an embodiment where the device that will carry out the action is physically remote or otherwise separate from the device/system implementing this process to determine the action to be taken, the providing step may include transmitting the determined action from one device/system to another. This may be a wired or wireless transmission, according to any known transmission protocol, such as by radio frequency transmission (e.g., WiFi, Bluetooth), infrared transmission, Ethernet or CAN bus transmission, etc.

In one embodiment, all of the process steps of FIG. 8 can be performed in real- or near-real time. For example, the method can be performed as the device/vehicle/drone etc. travels along a row of the field. A camera may capture images, which may be passed to an onboard system to identify the unique plant features 802, model plants 804, identify parameters 806, and determine actions 808, and provide 810 those actions to an implement of the vehicle. All steps 802-810 are capable of being performed in a time between when the cameras capture the images of the plants for whom action 808 is to be determined, and when the implement to carry out those action passes by those same plants along the field. For example, in various embodiments, the vehicle may be traveling at a speed between 1 and 20 miles per hour, and the camera may be capturing images at a frequency within an order of magnitude of 30 Hertz. Given the length of the device or vehicle, the physical distance between the cameras and the implement that performs the action may be approximately a foot, and/or within an order of magnitude of a foot. As a consequence, the process of FIG. 8 can be carried out before the vehicle travels the distance between the cameras and the implement. This means that the device/vehicle can completely carry out the steps FIG. 8 in a time range between 40 and 100 milliseconds. This entirely eliminates the need for offboard processing, and allows action while the device/vehicle is in the field, rather than requiring a first pass to identify what to do, and a second pass to actually do it.

In another embodiment, the process of FIG. 8 can be carried out over different time periods. For example, image collection by the cameras may occur during a first time period as the device travels through the field. Unique feature detection 802, and the other processing steps 804-808 may occur over a second time period later in time, such as in an office or away from the field. The action to be taken 810 may be performed during a third time, such as when the same or a different device/vehicle/UAV travels through the field to carry out the action.

X. Additional Considerations

The processes described above may be embodied in computer program instructions stored within a non-transitory computer-readable storage medium, and designed to be executed by one or more computer processors within one or more computing devices. The non-transitory computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes described above. As a person skilled in the art will recognize from the previous detailed description and from the figures and claims, modifications and changes can be made to the preferred embodiments of the invention without departing from the scope of this invention, one implementation of which is set forth in the following claims.

What is claimed is:

1. A method comprising:
accessing a plurality of skeleton segments representing a plant located in a field captured in an image, each skeleton segment of the plurality of skeleton segments representing a portion of the plant and comprising one or more nodes;
identifying, from the plurality of skeleton segments, a set of candidate skeleton segments, each candidate skeleton segment representing a portion of the plant located near a ground surface of the field captured in the image;
building a virtual model of the plant by connecting each candidate skeleton segment to a neighboring skeleton segment, wherein each neighboring skeleton segment represents an adjacent portion of the plant positioned farther from the ground surface than the portion of the plant represented by the candidate skeleton segment connected to the neighboring skeleton segment;
determining a treatment for the plant using the virtual model; and
generating instructions to apply the determined treatment to the plant.

2. The method of claim 1, wherein each candidate skeleton segment of the set of candidate skeleton segments represents a portion of a stalk of the plant located near the ground surface of the field captured in the image.

3. The method of claim 1, wherein building the virtual model of the plant further comprises:
for each candidate skeleton segment,
identifying a neighboring skeleton segment within a threshold distance of the candidate skeleton segment; and
connecting a node of the candidate skeleton segment to a node of the neighboring skeleton segment.

4. The method of claim 1, further comprising:
determining a probability that each connected candidate skeleton segment and neighboring skeleton segment represent part of a stalk of the plant.

5. The method of claim 4, further comprising:
determining that the connected skeleton segment and neighboring skeleton segment represent part of the stalk of the plant based on the determined probability;
identifying a second neighboring skeleton segment within a threshold distance of the connected neighboring skeleton segment; and
connecting a node of the second neighboring skeleton segment with an available node of the connected neighboring skeleton segment.

6. The method of claim 1, further comprising:
for each plant of a plurality of plants in the field, accessing a virtual model representing the plant, the accessed virtual model generated using a plurality of skeleton segments representing the plant in the field; and
generating a virtual model representing the plurality of plants in the field by mosaicking the plurality of stored virtual models.

7. The method of claim 1, further comprising:
analyzing the virtual model to determine a plant parameter representing a measurement of the plant;
determining a treatment to apply to the plant based on the plant parameter and the virtual model;
generating instructions to actuate a treatment mechanism to apply the determined treatment; and
treating the plant with the determined treatment by actuating the treatment mechanism using the generated instructions.

8. A plant treatment system comprising:
an imaging system comprising at least one camera configured to capture images of plants in a field as the plant treatment system passes through the field;
a nozzle configured to apply treatments to plants in the field as the plant treatment system passes through the field; and
a non-transitory computer readable storage medium storing instructions that, when executed by a processor, cause the processor to:
access a plurality of skeleton segments representing a plant located in a field captured in an image, each skeleton segment of the plurality of skeleton segments representing a portion of the plant and comprising one or more nodes;
identify, from the plurality of skeleton segments, a set of candidate skeleton segments, each candidate skeleton segment representing a portion of the plant located near a ground surface of the field captured in the image;
build a virtual model of the plant by connecting each candidate skeleton segment to a neighboring skeleton segment, wherein each neighboring skeleton segment represents an adjacent portion of the plant positioned farther from the ground surface than the portion of the plant represented by the candidate skeleton segment connected to the neighboring skeleton segment;
determine a treatment for the plant using the virtual model; and
generate instructions to apply the determined treatment to the plant.

9. The system of claim 8, wherein each candidate skeleton segment of the set of candidate skeleton segments represents a portion of a stalk of the plant located near the ground surface of the field captured in the image.

10. The system of claim 8, wherein building the virtual model further comprises instructions to:
for each candidate skeleton segment,
identify a neighboring skeleton segment within a threshold distance of the candidate skeleton segment; and
connect a node of the candidate skeleton segment to a node of the neighboring skeleton segment.

11. The system of claim 8, further comprising instructions to:
determine a probability that each connected candidate skeleton segment and neighboring skeleton segment represent part of a stalk of the plant.

12. The system of claim 11, further comprising instructions to:
determine that the connected skeleton segment and neighboring skeleton segment represent part of the stalk of the plant based on the determined probability;
identify a second neighboring skeleton segment within a threshold distance of the connected neighboring skeleton segment; and
connect a node of the second neighboring skeleton segment with an available node of the connected neighboring skeleton segment.

13. The system of claim 8, further comprising instructions to:
for each plant of a plurality of plants in the field, access a virtual model representing the plant, the accessed virtual model generated using a plurality of skeleton segments representing the plant in the field; and
generate a virtual model representing the plurality of plants in the field by mosaicking the plurality of stored virtual models.

14. The system of claim 8, wherein the plant treatment system further comprises a physical implement for executing a plant thinning practice and further comprising instructions to:
analyze the virtual model to determine a plant parameter representing a measurement of the plant;
determine a treatment to apply to the plant based on the plant parameter and the virtual model;
generate instructions to actuate a treatment mechanism to apply the determined treatment; and
treat the plant with the determined treatment by actuating the treatment mechanism using the generated instructions.

15. A non-transitory computer readable storage medium storing instructions that, when executed by a processor, cause the processor to:
access a plurality of skeleton segments representing a plant located in a field captured in an image, each skeleton segment of the plurality of skeleton segments representing a portion of the plant and comprising one or more nodes;
identify, from the plurality of skeleton segments, a set of candidate skeleton segments, each candidate skeleton segment representing a portion of the plant located near a ground surface of the field captured in the image;
build a virtual model of the plant by connecting each candidate skeleton segment to a neighboring skeleton segment, wherein each neighboring skeleton segment represents an adjacent portion of the plant positioned farther from the ground surface than the portion of the plant represented by the candidate skeleton segment connected to the neighboring skeleton segment;
determine a treatment for the plant using the virtual model; and
generate instructions to apply the determined treatment to the plant.

16. The non-transitory computer readable medium of claim 15, wherein each candidate skeleton segment of the set of candidate skeleton segments represents a portion of a stalk of the plant located near the ground surface of the field captured in the image.

17. The non-transitory computer readable medium of claim 15, wherein building the virtual model further comprises instructions to:
for each candidate skeleton segment,
identify a neighboring skeleton segment within a threshold distance of the candidate skeleton segment; and
connect a node of the candidate skeleton segment to a node of the neighboring skeleton segment.

18. The non-transitory computer readable medium of claim 15, further comprising instructions to:
determine a probability that each connected candidate skeleton segment and neighboring skeleton segment represent part of a stalk of the plant.

19. The non-transitory computer readable medium of claim 18, further comprising instructions to:
determine that the connected skeleton segment and neighboring skeleton segment represent part of the stalk of the plant based on the determined probability;
identify a second neighboring skeleton segment within a threshold distance of the connected neighboring skeleton segment; and
connect a node of the second neighboring skeleton segment with an available node of the second neighboring skeleton segment.

20. The non-transitory computer readable medium of claim 15, further comprising instructions to:
for each plant of a plurality of plants in the field, access a virtual model representing the plant, the accessed virtual model generated using a plurality of skeleton segments representing the plant in the field; and
generate a virtual model representing the plurality of plants in the field by mosaicking the plurality of stored virtual models.

21. The non-transitory computer readable medium of claim 15, further comprising instructions to:
analyze the virtual model to determine a plant parameter representing a measurement of the plant;
determine a treatment to apply to the plant based on the plant parameter and the virtual model;
generate instructions to actuate a treatment mechanism to apply the determined treatment; and
treat the plant with the determined treatment by actuating the treatment mechanism using the generated instructions.

* * * * *